(12) United States Patent
Xu et al.

(10) Patent No.: US 8,861,713 B2
(45) Date of Patent: Oct. 14, 2014

(54) CLIPPING BASED ON CEPSTRAL DISTANCE FOR ACOUSTIC ECHO CANCELLER

(71) Applicant: Texas Instruments Incorporated, Dallas, TX (US)

(72) Inventors: Jianzhong Xu, Gaithersburg, MD (US); Bogdan Kosanovic, Bethesda, MD (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/845,074

(22) Filed: Mar. 17, 2013

(65) Prior Publication Data

US 2014/0270149 A1    Sep. 18, 2014

(51) Int. Cl.
*H04M 9/08* (2006.01)
*H04M 3/00* (2006.01)

(52) U.S. Cl.
CPC .................................... *H04M 3/002* (2013.01)
USPC .................................................. 379/406.05

(58) Field of Classification Search
CPC ....... H04M 9/082; H04M 3/002; H04B 15/00
USPC .................................................. 379/406.05
See application file for complete search history.

(56) References Cited

U.S. PATENT DOCUMENTS 6,195,430 B1 * 2/2001 Eriksson et al. .......... 379/406.05
6,922,403 B1 * 7/2005 Yoo ............................... 370/286

OTHER PUBLICATIONS

Augustine H. Gray, Jr and John D. Markel, "Distance Measures for Speech Processing", IEEE Transactions on Acoustics, Speech, and Signal Processing, vol. ASSP-24, No. 5, Oct. 1976, pp. 380-391.
Eberhard Hansler and Gerhard Schmidt, "Acoustic Echo and Noise Control a Practical Approach", Wiley Series in Adaptive and Learning Systems for Signal Processing, Communication, and Control, published by John Wiley & Sons, Inc., 2004, Hoboken, NJ, pp. 330-333.
Lawrence Rabiner and Biing-Hwang Juang, "Fundamentals of Speech Recognition", Prentice Hall Signal Processing Series, published by Prentice Hall PTR Prentice-Hall, Inc., 1993, Upper Saddle River, NJ, pp. 112-117 and 162-170.

* cited by examiner

*Primary Examiner* — Alexander Jamal
(74) *Attorney, Agent, or Firm* — Steven A. Shaw; Frederick J. Telecky, Jr.

(57) ABSTRACT

Echo cancellation is provided in a telephone device by calculating a metric value indicative of a similarity between a representation of an incoming signal from a far end talker and a representation of an outgoing signal from a near end talker. A threshold value is derived based on the metric value. A portion of the outgoing signal is removed by using the threshold value to determine an amount to remove from the outgoing signal with continuous, real-time updating of the threshold value.

19 Claims, 5 Drawing Sheets

CLIPPING BASED ON CEPSTRAL DISTANCE FOR ACOUSTIC ECHO CANCELLER

FIELD OF THE INVENTION

This invention generally relates to echo cancellation in a voice communication device.

BACKGROUND OF THE INVENTION

Echo cancellers are the replacement for earlier echo suppressors that were initially developed in the 1950s to control echo caused by the long delay on satellite telecommunications circuits. Initial echo canceller theory was developed at AT&T Bell Labs in the 1960s. The concept of an echo canceller is to synthesize an estimate of the echo from the talker's signal, and subtract that synthesis from the return path instead of switching attenuation into/out of the path. This technique requires adaptive signal processing to generate a signal accurate enough to effectively cancel the echo, where the echo can differ from the original due to various kinds of degradation along the way.

Rapid advances in the implementation of digital signal processing allowed echo cancellers to be made smaller and more cost-effective. In the 1990s, echo cancellers were implemented within voice switches for the first time (in the Northern Telecom DMS-250) rather than as standalone devices. The integration of echo cancellation directly into the switch meant that echo cancellers could be reliably turned on or off on a call-by-call basis, removing the need for separate trunk groups for voice and data calls. Today's telephony technology often employs echo cancellers in small or handheld communications devices via a software voice engine, which provides cancellation of either acoustic echo or the residual echo introduced by a far-end PSTN (public switched telephone network) gateway system; such systems typically cancel echo reflections with up to 64 milliseconds delay.

Voice messaging and voice response systems which accept speech for caller input may use echo cancellation while speech prompts are played to prevent the system's own speech recognition from falsely recognizing the echoed prompts.

Examples of other systems that may include echo cancellation include: hands-free car phone systems; a standard telephone or cell phone in speakerphone or hands-free mode; standalone speakerphone, dedicated standalone "conference phones"; installed room systems which use ceiling speakers and microphones on the table; and physical coupling (vibrations of the loudspeaker transfer to the microphone via the handset casing).

In most of these cases, direct sound from the loudspeaker from the person at the far end enters the microphone almost unaltered. The difficulties in cancelling echo stem from the alteration of the original sound by the ambient space. These changes can include certain frequencies being absorbed by soft furnishings, and reflection of different frequencies at varying strength.

BRIEF DESCRIPTION OF THE DRAWINGS

Particular embodiments in accordance with the invention will now be described, by way of example only, and with reference to the accompanying drawings.

Figure 1:
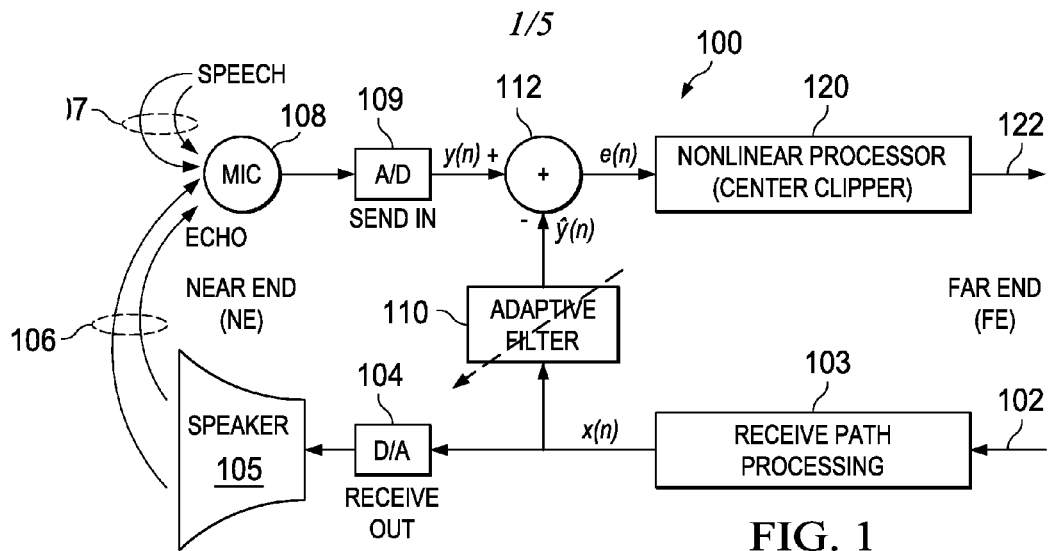
FIG. 1 is a block diagram of an example voice communication device that provides acoustic echo cancellation.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A center clipper is widely used in the nonlinear processing of an acoustic echo canceller (AEC). In an embodiment of the invention, the clipping threshold is calculated from the predicted echo and scaled differently during single talk and double talk. A measure of the similarity between far end speech and near end speech may be used to scale the clipping threshold to make it high during single talk and low during double talk, as will be described in more detail herein.

The cepstral distance is a measure of the similarity between far end and near end speech and is described in more detail in reference [1]. The cepstral distance may be used to scale the clipping threshold to make it high during single talk and low during double talk.

FIG. 1 is a block diagram of an example telephone transceiver device 100 that provides acoustic echo cancellation. Transceiver device 100 may be part of a hands-free car phone systems, for example; or a standard telephone or cell phone in speakerphone or hands-free mode; a dedicated standalone "conference phone"; an installed room system which uses ceiling speakers and microphones on the table, etc.

An incoming signal 102 is received from a far end device, which is typically another telephone. Incoming signal 102 may arrive over a wired connection via the public switched network (PSTN), for example, or it may arrive via a wireless connection, such as the cellular network for example. It may also arrive via the internet or other type of local or wide area network in the form of voice over internet protocol (VoIP), for example. The incoming signal may be received via other known or later developed transport facilities.

Incoming signal 102 typically represents an audio voice signal originated by a person at the other end of the telephone conversation referred to as the far end talker, however, the incoming signal may also originate from any number of other sources, such as a voice activated system, a modem, etc. Receive path processing logic 103 receives the incoming signal and may perform amplification and demodulation to form digital signal x(n) in the case incoming signal 102 is a wireless signal. x(n) is a digital representation of incoming audio signal 102. Similarly, demodulation may be performed in the case incoming signal 102 is a VoIP signal or a digital signal received via a PSTN, for example. Digital signal x(n) is converted to an analog signal by digital to analog converter 104 and then converted to audio 106 by speaker 105. Speaker 105 may be a built in speaker within telephone device 100, for example. Speaker 105 may also be spaced apart from telephone device 100 if device 100 is part of a teleconferencing system, for example. Speaker 105 may also be in the form of a headset or other sound reproducing device.

Audio signal 106 is typically intended to be heard by a person or persons located adjacent telephone device 100, referred to as the near end talker. Microphone 108 receives spoken speech 107 from the near end talker and forms an internal signal that is converted to a digital representation y(n) by analog to digital converter 109 A portion of audio signal 106 may travel through the air and reach microphone 108 and thereby become part of local signal y(n). This portion of signal 106 is referred to as an echo. While the echo typically travels through the air, it may also travel trough the physical enclosure of device 100 in the form of vibrations and be picked up by microphone 108. The echo may take several different paths through the air by reflecting off nearby and distant surfaces, and may therefore have several different multipath components.

Adaptive filter 110 models the echo path and attempts to provide an estimate, 9(n), of the acoustic echo portion of local signal y(n) that is subtracted from the local signal by subtractor 112 to form error signal e(n). Error signal e(n) then provides a feedback signal to adaptive filter 110. As long as the near end talker is silent and there are no other audio sources besides echo 106, adaptive filter 110 may be able to remove a significant portion of the echo from local signal y(n) due to the closed loop operation of adaptive filter 110; however, a residual amount of echo e(n) is typically present. Nonlinear processor (NLP) 120 removes a portion of outgoing signal 120 to thereby effectively remove the residual echo, e(n). This may be performed using a center clipper function that clips a portion of output signal 122 that is below a clipping threshold value. However, the center clipper can also attenuate and damage the near end speech when both far end and near end talkers are speaking simultaneously. Therefore, it is desirable that the clipping threshold stays low during double talk as the near end speech can cover the residual far end echo that is not removed by the center clipper. However, on the other hand, it is desirable to have a high clipping threshold in order to completely remove residual echo when only the far end talker is speaking, especially when the near end echo path changes due to movements of phone, object, or people.

Computation of Cepstral Distance

Figure 2:
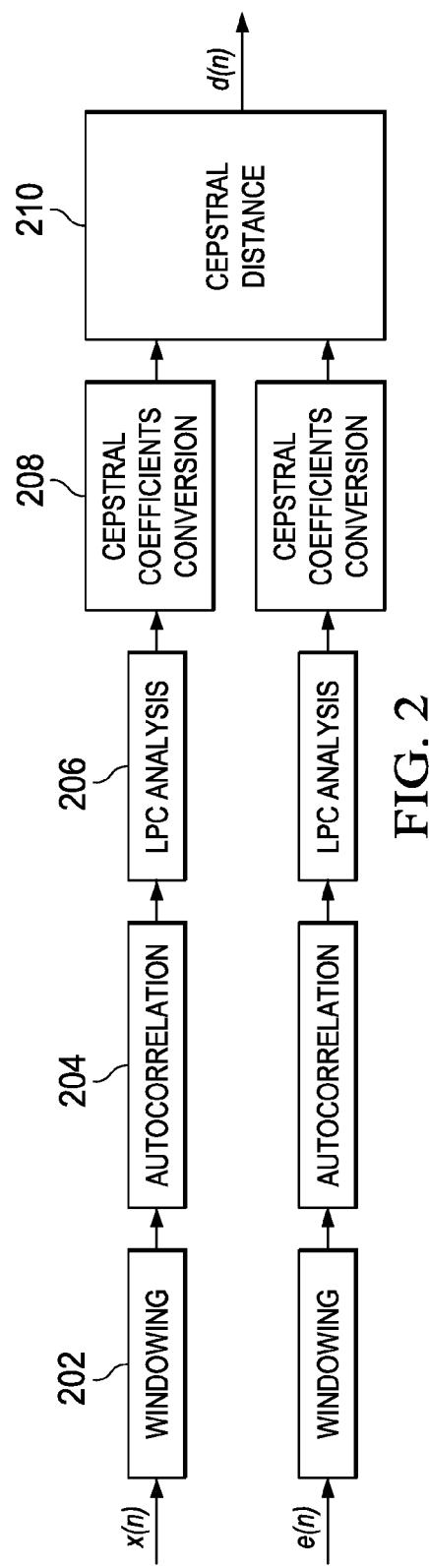
FIG. 2 is a flow chart illustrating calculation of cepstral distance.

FIG. 2 is a flow chart illustrating calculation of cepstral distance between incoming signal x(n) and error signal e(n). Generally, the clipping threshold is calculated from the predicted echo and scaled differently during single talk and double talk. The cepstral distance, which is a measure of the similarity between far end and near end speech, can be used to scale the clipping threshold to make it high during single talk and low during double talk. In this example, the cepstral distance between e(n) and x(n) is used for detection of double talk and to scale the center clipping threshold. Other embodiments may use various combinations of x(n), y(n), ŷ(n), and e(n).

A cepstrum is the result of taking the Fourier transform of the logarithm of the estimated spectrum of a signal. There is a complex cepstrum, a real cepstrum, a power cepstrum, and phase cepstrum. The power cepstrum in particular is useful for analysis of human speech. The name "cepstrum" was derived by reversing the first four letters of "spectrum". Operations on cepstra may be referred to as cepstral analysis.

An efficient way to calculate the cepstral distance between two signals is given by reference [2]. The cepstral coefficients of signal x(n) may be computed using equations 1-8 as described below. The digital representation of each audio signal is a sequence of blocks of digital samples. The blocks may be organized in a straight sequential manner, or may be organized in an overlapping manner, where each block includes a portion of the samples from a previous block. A set of cepstral coefficients are determined for each block.

Windowing 202 is performed on a block of audio signal x(n) as shown by equation (1).

$$\tilde{x}_l(n) = x_l(n)w(n), 0 \leq n \leq N-1 \quad (1)$$

where l is the block index, N is the block length, and w(n) is a weighting function such as a simple rectangular window function or a more complex function such as a Hamming window. N is typically in the range of approximately 10-16 for a 4 Khz signal.

Autocorrelation 204 is then performed on the block of audio signal x(n) as shown by equation (2).

$$r_l(m) = \sum_{n=0}^{N-1-m} \tilde{x}_l(n)\tilde{x}_l(n+m), m = 0, 1, \ldots, p. \quad (2)$$

where p is the LPC order.

Linear predictive code (LPC) analysis 206 is then performed on the block of audio signal x(n) as shown by the set of equations (3), which are solved recursively for i=1, 2, ..., p.

$$E^{(0)} = r(0) \quad (3)$$

$$k^{(i)} = \left\{ r(i) - \sum_{j=1}^{i-1} \alpha_j^{(i-1)} r(i-j) \right\} \Big/ E^{(i-1)}$$

$$\alpha_i^{(i)} = k^{(i)}$$

$$\alpha_j^{(i)} = \alpha_j^{(i-1)} - k^{(i)}\alpha_{i-j}^{(i-1)}, j = 1, 2, \ldots, i-1$$

$$E^{(i)} = [1 - (k^{(i)})^2] E^{(i-1)}$$

The LPC coefficients are given after the final iteration p according to equation (4).

$$a_m = \alpha_m^{(p)}, m = 1, 2, \ldots, p \quad (4)$$

The LPC coefficients are converted 208 to cepstral coefficients according to equations (5) and (6).

$$c_m = a_m + \sum_{k=1}^{m-1}\left(\frac{k}{m}\right) c_k a_{m-k}, 1 \leq m \leq p \quad (5)$$

$$c_m = \sum_{k=1}^{m-1}\left(\frac{k}{m}\right) c_k a_{m-k}, m > p \quad (6)$$

Similarly, the cepstral coefficients $c'_m$ of signal e(n) are calculated.

Finally, the cepstral distance between x(n) and e(n) is computed 210 as the Euclidean distance between the weighted M-order cepstral coefficients according to equations (7) and (8).

$$d_{cep} = \sum_{m=1}^{M} (w_m c_m - w_m c'_m)^2, \quad (7)$$

$$w_m = 1 + \frac{M}{2} \sin\left(\frac{m\pi}{M}\right), m = 1, 2, \ldots, M \quad (8)$$

Control of Center Clipping by Cepstral Distance

Figure 3A:
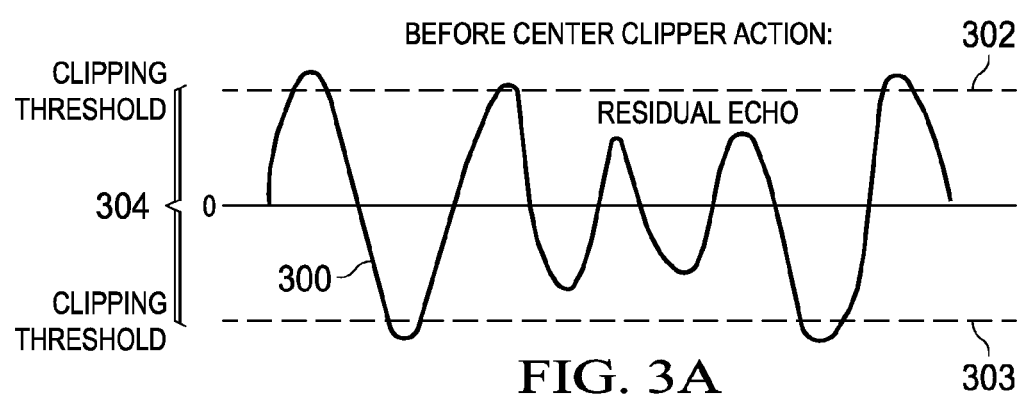
FIGS. 3A and 3B are plots illustrating center clipping.
Figure 3B:
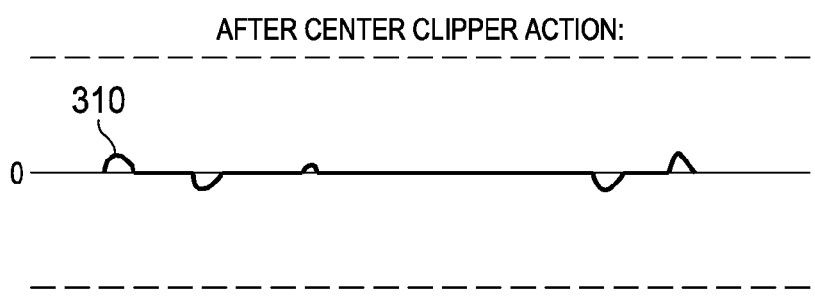

FIGS. 3A and 3B are plots illustrating center clipping. In FIG. 3A, an audio signal 300 is illustrated. A positive clipper threshold 302 is established, with a similar negative clipper threshold 303. The center portion 304 of signal 300 that is between clipper thresholds 302, 303 is removed and produces a resultant signal illustrated in FIG. 3B. Note that only the portions that exceeded the clipper threshold remain, such as blip 310. Thus, when the clipper threshold is high, little or none of audio signal remains, while when the clipper threshold is low or zero, most, or all of audio signal 300 is passed through.

As mentioned earlier, it is desirable to have high clipping threshold when only the far end talker is speaking so that a far end talker hears only silence rather than an echo of the speaker's own voice, and a low clipping threshold during double talk or when only the near end talker is speaking so that the far end talker can hear what the near end talker is saying. The cepstral distance provides a metric value that indicates the similarity between two signals. Therefore, the cepstral distance between e(n) and x(n) may be used to scale the center clipping threshold. The larger the distance, the more likely the near end signal has both far end echo and near end talker speech, and thus the lower the clipping threshold should be. On the other hand, the smaller the distance, the more likely that the near end signal has only far end echo, and thus the higher the clipping threshold should be.

Figure 4:
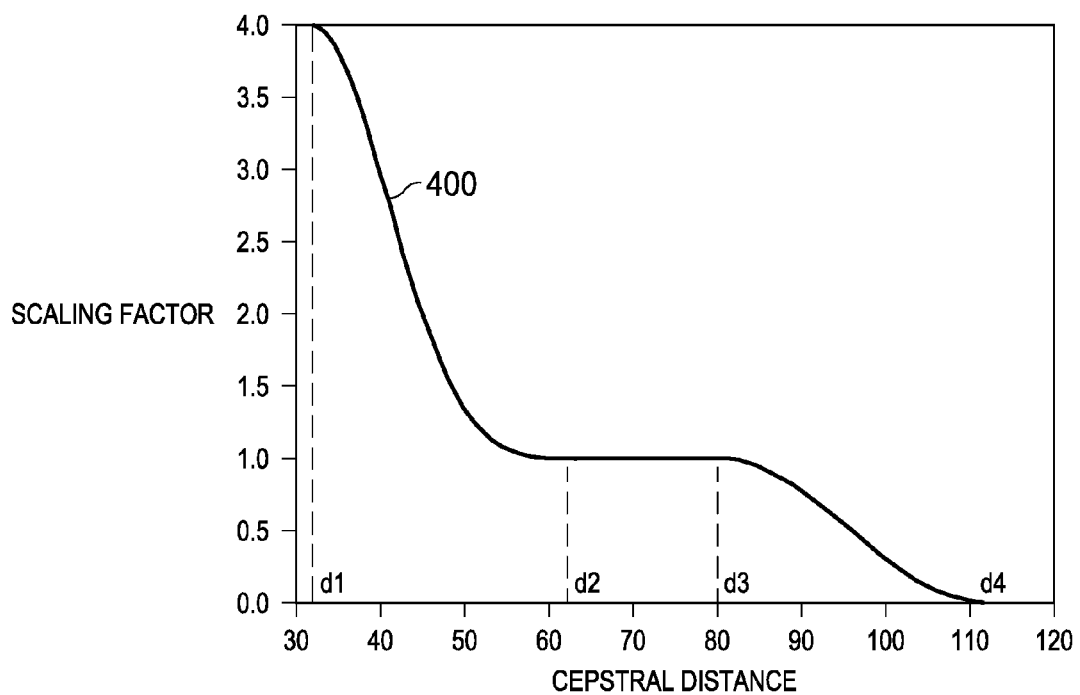
FIG. 4 is a plot of a non-linear function for calculating a threshold value

FIG. 4 is a plot of an example monotonically non-increasing function for calculating a threshold value. A monotonically non-increasing function generally decreases i value as the argument value, in case the cepstral distance, increases. A monotonically non-increasing function may have one or more level portions, such as illustrated between cepstral value d2 and d3, referring to FIG. 4. In this example, a nominal threshold value is defined and then a scaling value is used to increase or decrease the threshold value in a real-time manner. A function may be used to map the cepstral distance to the scaling factor for the clipping threshold. The function should map a small cepstral distance to a high scaling factor, and map a large cepstral distance to low scaling factor. The scaling factor may start from a number greater than one at the smallest distance and may decrease to a low value, such as zero, at the largest distance. In some embodiments the mapping function may be configurable to allow a different clipping profile to be used for different types of applications and enclosures.

For example, for sixteen bit audio signal samples (max sample value=32767) assume the clipper threshold is defined to be 1000 before being scaled. Assume the cepstral distance for a given block is 30. Then from FIG. 4, the scaling factor will be 4 (determined by the cepstral distance). Therefore, the clipper threshold will be scaled to 4000 for that sample block. At a different time, assume the cepstral distance is 96 for a different sample block. Then from FIG. 4, the scaling factor will be 0.5. Then the clipper threshold will be scaled to 500 for that sample block.

The initial clipper threshold may be defined based on a function of incoming signal x(n) and the convergence of adaptive filter 110. For example, if x(n) is large and convergence is low, the initial clipper threshold may be defined to be large because echo would be high in e(n) due to large x(n) and low convergence. On the other hand, if x(n) is large but convergence is very high, meaning adaptive filter estimates echo very well, then echo would be low in e(n) and thus clipper threshold may be defined to be small.

The example monotonically non-increasing scaling function plotted in FIG. 4 is determined according to the set of equations (9).

$$s(d) = \begin{cases} s(d_1), d < d_1 \\ \left\{ \left[1 - \cos^2\left(\frac{d-d_1}{d_2-d_1} \cdot \frac{\pi}{2}\right)\right]^2 + 1 \right\}^2, d_1 \leq d < d_2 \\ 1, d_2 \leq d \leq d_3 \\ \cos^2\left(\frac{d-d_3}{d_4-d_3} \cdot \frac{\pi}{2}\right), d_3 < d \leq d_4 \\ s(d_4), d > d_4 \end{cases} \quad (9)$$

where d is the cepstral distance, s is the scaling factor; $d_1$, $d_2$, $d_3$, and $d_4$ are configurable cepstral distance value.

An example of this function is shown in FIG. 4 where $(d_1,d_2,d_3,d_4)=(32,64,80,112)$ for LPC order 10 and cepstral coefficients order 32. In other embodiments, the maximum scaling factor may be set to a value that is larger or smaller than four, for example.

In another embodiment, other types of functions may be used to map the cepstral distance to the scale factor. For example, straight line segments may be used in place of the cosine functions of equations (9). In another example, a single straight line may be used in place of equations (9) such that at d1 the straight line indicates a scale factor of four and at d4 the straight line indicates a scale factor of zero, for example. While a monotonic non-increasing function is described above, other embodiments may use a function that is not monotonic and may include portions in which the clipping threshold increases when cepstral distance increases. A mapping function may also include other variables besides cepstral distance to control the clipping threshold, such as correlation between signals x(n) and e(n) or other combinations of signals, signal power of x(n) and e(n), etc. One skilled in the art will quickly see that any number of linear or non-linear functions may be used to map the scale factor to the cepstral distance in a manner that produces a high clipping threshold when the cepstral distance is short and produces a low clipping threshold when the cepstral distance is large.

Figure 5:
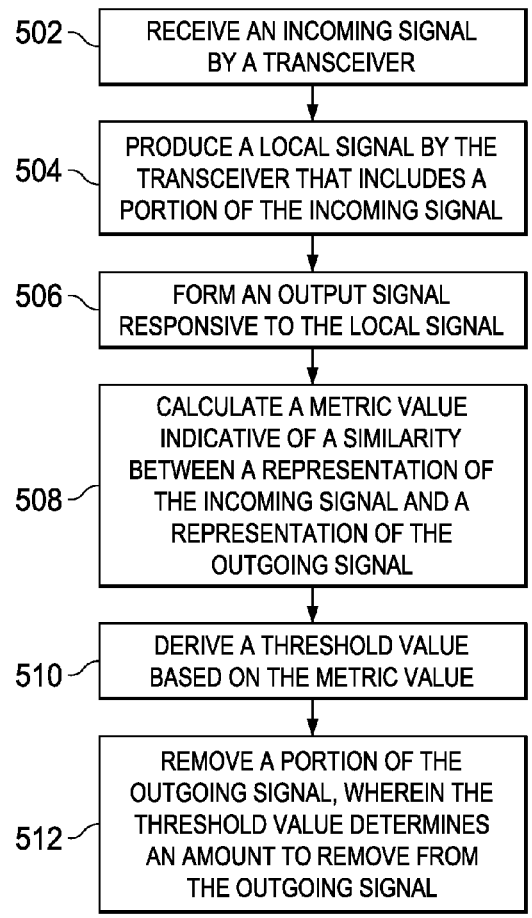
FIG. 5 is a flow chart illustrating echo cancellation using a similarity metric to control center clipping.

FIG. 5 is a flow chart illustrating echo cancellation using a similarity metric to control center clipping. This example is intended for use within transceiver that is part of a telephone teleconferencing system, for example. However other embodiments may be located elsewhere, such as within a switching node of a PSTN, or at a far end device, for example.

An incoming voice signal is received 502 by the transceiver. The signal may need to be amplified and demodulated to extract it from a carrier signal or otherwise processed to form a sequence of digital data samples that are representative of the speech signal produced by a far end talker.

The transceiver also produces 504 a local signal that includes a portion of the incoming signal. Typically, the local signal will be produced by a microphone that receives audible speech from a near end talker. As discussed above in more detail, the included portion of the incoming signal in the local signal is typically an undesirable echo. The echo may be the result of a microphone picking up a portion of the incoming signal that is reproduced by a speaker or headset, for example. The amount of echo may vary based on the physical orientation of the transceiver and the audio reflective surfaces in the room in which the transceiver is operating. The echo may also mechanically travel through the transceiver housing in the form of vibrations, for example.

An output signal is formed 506 responsive to the local signal. Typically, an adaptive filter will be used to model the echo signal and an estimate of the echo is then subtracted from the local signal to form the output signal. The output signal may also be treated as an error signal and provided to the adaptive filter to form a closed loop adaptive filter system.

A metric value indicative of a similarity between a representation of the incoming signal and a representation of the outgoing signal is calculated 508. As discussed in more detail above, a cepstral distance provides a good metric value for this use. However, other types of metric values indicative of signal similarity may be used, such as a root mean square (rms) log spectral distance, a likelihood ratio (minimum residual principle or delta coding (DELCQ) algorithm), or a cosh measure (based upon two nonsymmetrical likelihood ratios), for example.

In this example, the cepstral distance is calculated by comparing the error signal e(n) produced by the adaptive filter, which is representative of the output signal, with the input signal y(n), referring again to FIG. 1. Other embodiments may use various combinations of x(n), y(n), ŷ(n), and e(n).

A threshold value is derived 510 based on the metric value. As described in more detail above, the threshold value may be derived in a two step process by first defining an initial clipping threshold value and then scaling the initial clipping threshold value by a scale factor that is mapped to the cepstral distance. Other embodiments may use a function that calculates the threshold value directly from the cepstral distance, for example.

A portion of the outgoing signal is removed 512; the amount that is removed is determined by the clipping threshold value. This is typically performed using a center clipper function that clips a portion of output signal that is below the clipping threshold value. However, in other embodiments, a different form of clipping or signal modification may be performed to reduce or eliminate an echo signal, such as performing non-symmetrical clipping or using attenuation in place of clipping, for example.

This entire process is repeated in a periodic manner to derive a new threshold value in a continuous, real time manner so that single talker-double talker detection and clipping threshold adjustment continuously tracks current conditions.

SYSTEM EXAMPLE

Figure 6:
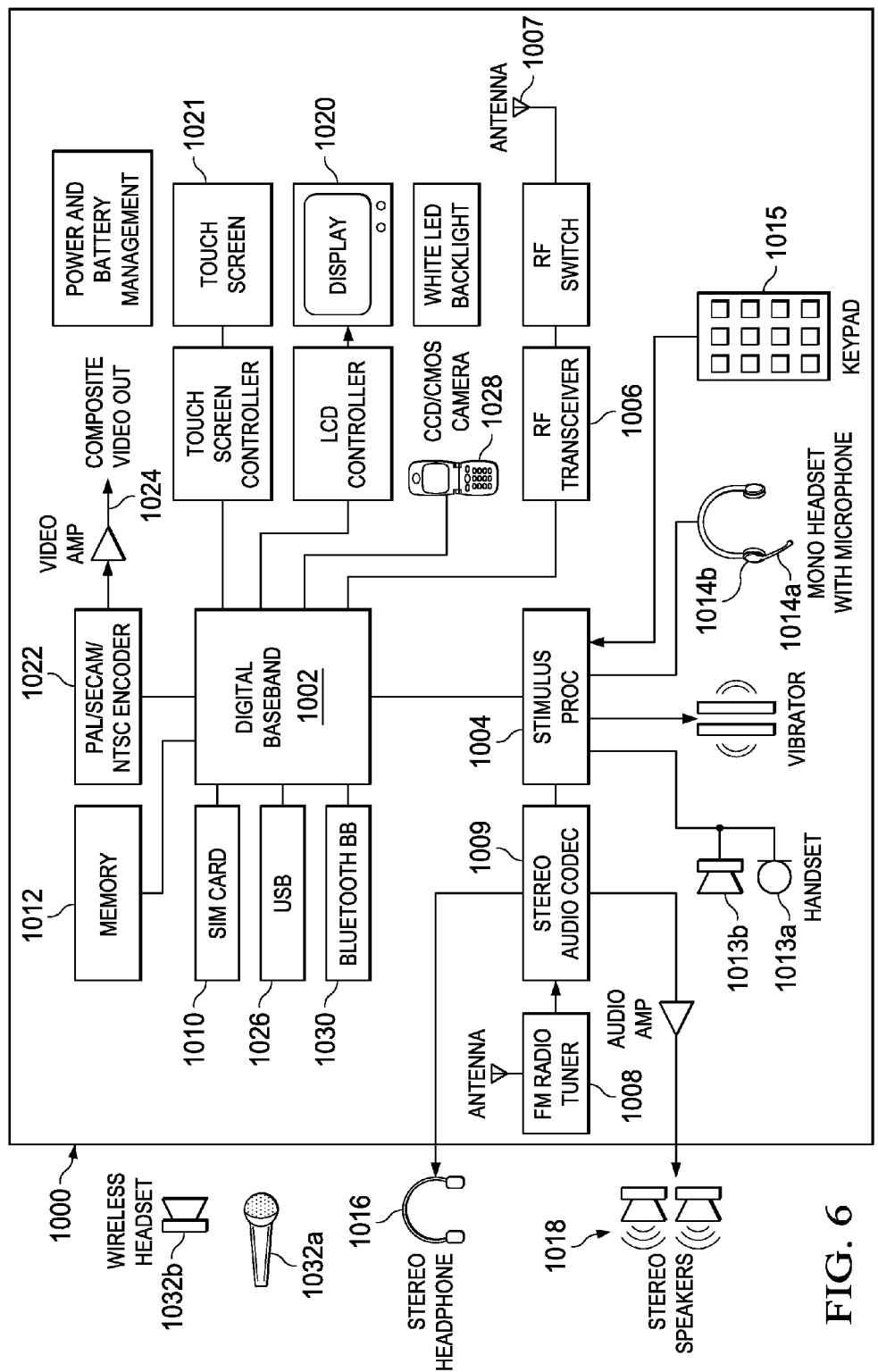
FIG. 6 is a block diagram illustrating an example cell phone that performs echo cancellation.

FIG. 6 is a block diagram of an exemplary mobile cellular phone 1000 that includes an embodiment of the present invention. Digital baseband (DBB) unit 1002 may include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP 1004 performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 is a digital radio processor and includes a receiver for receiving a stream of coded data frames from a cellular base station via antenna 1007 and a transmitter for transmitting a stream of coded data frames to the cellular base station via antenna 1007. RF transceiver 1006 is coupled to DBB 1002 which provides processing of the frames of encoded data being received and transmitted by cell phone 1000.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Touch screen 1021 may be connected to DBB 1002 for haptic feedback. Display 1020 may also display pictures received from the network, from a local camera 1028, or from other sources such as USB 1026. DBB 1002 may also send a video stream to display 1020 that is received from various sources such as the cellular network via RF transceiver 1006 or camera 1028. DBB 1002 may also send a video stream to an external video display unit via encoder 1022 over composite output terminal 1024. Encoder unit 1022 can provide encoding according to PAL/SECAM/NTSC video standards. In some embodiments, audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc.

As described in more detail above, DBB 1002 executes instruction code stored in memory 1012 that configures DBB 1002 to calculate a metric value indicative of a similarity between a representation of the incoming signal and a representation of the outgoing signal, derive a threshold value based on the metric value, and remove a portion of the outgoing signal, wherein the threshold value determines an amount to remove from the outgoing signal. This is performed continually in a periodic manner while the phone is in speaker mode, as described in more detail above, to suppress an echo signal that may be received by microphone 1013A or microphone 1014A.

Other Embodiments

While the invention has been described with reference to illustrative embodiments, this description is not intended to be construed in a limiting sense. Various other embodiments of the invention will be apparent to persons skilled in the art upon reference to this description. For example, while use of cepstral distance has been described herein, other embodiments may use other known or later developed techniques for determining a similarity between the incoming far-end signal and outgoing signal that may contain an echo component. For example, a root mean square (rms) log spectral distance, a likelihood ratio (minimum residual principle or delta coding (DELCQ) algorithm), or a cosh measure (based upon two nonsymmetrical likelihood ratios), for example, may be used. A simple nonlinear transformation of the likelihood ratio may be highly correlated with the rms log spectral measure over expected ranges. As described in more detail in reference [1], the likelihood ratio, cepstral measure, and cosh measure are easily evaluated recursively from linear prediction filter coefficients, and each has a meaningful and interrelated frequency domain interpretation.

While in this example, an initial threshold value is defined and then scaled by a scale factor that is mapped to the cepstral distance, other embodiments may use a function that calculates the threshold value directly from the cepstral distance, or other similarity metric value, rather than performing the two step sequence described above, for example.

One skilled in the art will quickly see that any number of linear or non-linear functions may be used to derive a threshold value based on a metric value that is indicative of a similarity between a representation of the incoming signal and a representation of the outgoing signal in which the threshold value is set high when the similarity metric value indicates a close match and in which the threshold value is set low when the similarity metric value indicates little or no match.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP), for example. A stored program in an onboard or external ROM (read only memory), flash EP (electrically programmed) ROM or FRAM (ferroelectric random access memory), for example, may be used to implement aspects of the echo suppression processing. Analog-to-digital converters and digital-to-analog converters provide coupling to the real world, modulators and demodulators (plus antennas for air interfaces) can provide coupling for waveform reception of an audio signal being broadcast over the air by satellite, cellular networks, etc or via wired networks such as the Internet.

The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key, etc), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

REFERENCES

[1] A. Gray and J. Markel, "Distance measures for speech processing", *IEEE Trans. Acoust., Speech, Signal Processing*, vol. ASSP-24, pp. 380-391, October 1976.
[2] L. Rabiner and B. Juang, "Fundamentals of Speech Recognition", Prentice Hall.
[3] E. Hänsler and G. Schmidt, "Acoustic Echo and Noise Control A Practical Approach", Wiley-Interscience.

What is claimed is:

1. A method for cancelling echo in a transceiver, the method comprising:
receiving an incoming signal by the transceiver;
producing a local signal by the transceiver, wherein the local signal includes a portion of the incoming signal;
forming an output signal responsive to the local signal;
calculating a metric indicative of a similarity between a representation of the incoming signal and a representation of the outgoing signal;
deriving a scaling factor based on the metric and
removing a portion of the outgoing signal by center clipping the outgoing signal using a clipping threshold scaled by the scaling factor, wherein the threshold is based on an error signal.

2. The method of claim 1, wherein the clipping threshold determines an amount to remove from the outgoing signal.

3. The method of claim 1, wherein the scaling factor is determined using a non-linear function of the metric.

4. The method of claim 3, wherein the scaling factor is a monotonically non-increasing function of the metric value.

5. The method of claim 1, wherein forming the output signal comprises subtracting an adaptively filtered portion of the input signal from the local signal to form a difference signal.

6. The method of claim 5, wherein the metric is calculated between the incoming signal and the difference signal.

7. The method of claim 1, wherein the metric is calculated periodically.

8. The method of claim 1, wherein the metric is a cepstral distance between the incoming signal and the outgoing signal.

9. The method of claim 1, wherein the transceiver is a voice communication device (VCD), and wherein the local signal is produced in response to a local talker, the incoming signal is from a far end talker, and the portion of the incoming signal is an echo.

10. A voice communication device (VCD) comprising:
a receiver coupled to a speaker; and
a microphone coupled to a non-linear processor
operable to:
calculate a metric indicative of a similarity between a representation of an incoming signal received by the receiver and a representation of an outgoing signal initiated by the microphone;

derive a scaling factor based on the metric wherein the non-linear processor comprising a center clipping function for removing a portion of the outgoing signal by clipping using a clipping threshold scaled by the scaling factor, wherein the threshold is based on an error signal.

11. The VCD of claim 10, wherein the the clipping threshold determines an amount to remove from the outgoing signal.

12. The VCD of claim 10, wherein the scaling factor is derived using a nonlinear function of the metric.

13. The VCD of claim 10, further comprising a subtractor coupled between the microphone and the non-linear processor and an adaptive filter coupled between the receiver and an input to the subtractor, wherein the subtractor is operable to subtract an adaptively filtered portion of the input signal from a signal produced by the microphone to form a difference signal, and wherein the metric is calculated between the incoming signal and the difference signal.

14. The VCD of claim 10, wherein the metric is a cepstral distance between the incoming signal and the outgoing signal that is calculated periodically.

15. A non-transitory computer-readable medium storing software instructions that, when executed by a processor, cause a method for reducing echo in a transceiver to be performed, the method comprising:

receiving an incoming signal by the transceiver;

producing a local signal by the transceiver, wherein the local signal includes a portion of the incoming signal;

forming an output signal responsive to the local signal;

calculating a metric indicative of a similarity between a representation of the incoming signal and a representation of the outgoing signal;

deriving a scaling factor based on the metric; and removing a portion of the outgoing signal by center clipping the outgoing signal using a clipping threshold scaled by the scaling factor, wherein the threshold is based on an error signal.

16. The method of claim 15, wherein the clipping threshold determines an amount to remove from the outgoing signal.

17. The method of claim 15, wherein the scaling factor is derived using a nonlinear function of the metric.

18. The method of claim 15, wherein forming the output signal comprises subtracting an adaptively filtered portion of the input signal from the local signal to form a difference signal; and wherein the metric is calculated periodically between the incoming signal and the difference signal.

19. The method of claim 15, wherein the metric is a cepstral distance between the incoming signal and the outgoing signal.

* * * * *